United States Patent [19]

Stephens et al.

[11] Patent Number: 5,602,455
[45] Date of Patent: Feb. 11, 1997

[54] PORTABLE BATTERY CHARGER WITH INTEGRALLY ATTACHED OUTPUT CABLE

[75] Inventors: Charles S. Stephens; David Williams; Tuan Tran; Masahiko Muranami, all of Corvallis; Terry Bradley, Monroe; Preston Brown, Eugene; Curtis Rose, Corvallis, all of Oreg.

[73] Assignee: Hewlett-Packard Company, Palo Alto, Calif.

[21] Appl. No.: 334,472

[22] Filed: Nov. 4, 1994

[51] Int. Cl.⁶ .......................... H01M 10/44; H01M 10/46
[52] U.S. Cl. ............................................ 320/2; 320/15
[58] Field of Search ........................... 320/2, 6, 15, 20, 320/22, 30, 35, 39, 56

[56] References Cited

U.S. PATENT DOCUMENTS

| D. 336,631 | 6/1993 | Ivester | D13/108 |
|---|---|---|---|
| D. 337,986 | 8/1993 | Brunner et al. | D13/108 |
| 4,806,840 | 2/1989 | Alexander et al. | 320/20 |
| 4,998,055 | 3/1991 | Nash et al. | 320/2 |
| 5,189,358 | 2/1993 | Tomura et al. | 320/2 |
| 5,200,685 | 4/1993 | Sakamoto | 320/2 |
| 5,200,686 | 4/1993 | Lee | 320/2 |
| 5,229,650 | 7/1993 | Kita et al. | 307/66 |
| 5,304,916 | 4/1994 | Le et al. | 320/23 |
| 5,327,067 | 7/1994 | Scholder | 320/2 |
| 5,477,123 | 12/1995 | Allen et al. | 320/2 |
| 5,483,437 | 1/1996 | Tang | 320/2 X |

FOREIGN PATENT DOCUMENTS

| 469533 | 2/1992 | European Pat. Off. |
| 4225746 | 2/1994 | Germany . |
| 2179228 | 7/1990 | Japan . |
| 2299426 | 12/1990 | Japan . |
| WO90/15466 | 12/1990 | WIPO . |
| WO93/19508 | 9/1993 | WIPO . |

OTHER PUBLICATIONS

Lenmar OmniSource Plus Battery Charger Model BCR 262 Owner's Manual (no date).

*Primary Examiner*—David H. Tso

[57] ABSTRACT

A battery charger is connected to a power source via an input cable. The battery charger has charge switching circuitry for delivering a charge to a battery under the control of a controller. The controller has state detection logic for detecting the current state of the battery, and charging logic for charging the battery by selectively enabling and disabling the charge switching circuitry based on the condition of the battery. An output cable is connected to the battery charger. The output cable delivers power from the power source to a second battery charger for charging a second battery for the electronic device. The output cable can be placed in a stowage position or a non-stowage position. The second battery charger may be external or internal to the electronic device. If the second battery charger is internal to the electronic device, two batteries can be charged at the same time the electronic device is being operated. The battery charger has the additional capability of detecting and correctly charging different battery types, and responding to error conditions detected during the charging operation.

14 Claims, 11 Drawing Sheets

PORTABLE BATTERY CHARGER WITH INTEGRALLY ATTACHED OUTPUT CABLE

FIELD OF THE INVENTION

This invention relates to the electronics circuitry field. More particularly, this invention is a method and apparatus for charging a plurality of batteries for an electronic device.

BACKGROUND OF THE INVENTION

In the past, electronic devices, such as televisions, stereo equipment, and desktop computers, were powered exclusively by plugging them into an electrical outlet contained in a house or office building. This umbilical attachment to a building meant that these devices didn't move around too much, since they were useless when they weren't plugged in. When a business person traveled, they were forced to leave their prized electronic devices behind.

But travelers wanted to take these devices along with them when they traveled. Manufacturers of these devices saw this need and gradually transformed these immobile devices into battery powered, portable electronic devices. Now a business person can take a battery powered television, stereo, computer, and/or other electronic device with them on a business trip—all in their briefcase.

This advancement in portability has been a boon to travelers, but has not been without its problems. One such problem is that the battery life of these portable devices is often quite short—only a few hours or so. Many business travelers have experienced the frustration of working on a portable computer during a long airplane ride, only to have the battery die before the work is done. Since the traveler knows that their battery isn't going to last very long, they have probably brought along a battery charger to charge their battery when it dies. But battery chargers are normally large, bulky items that must be plugged into a power source, such as a standard wall outlet of a hotel room or office building, before they are useful. Once plugged in, they can often be used to run the computer or other electronic device from the power source while the battery gets recharged.

Unfortunately, the battery, and thus the computer, is worthless until the business traveler gets to a hotel, office building, or other place with a power source.

Many travelers get around this problem by bringing along a fully charged "spare" battery that they can swap with the dead one. While this approach allows the traveler to use their computer longer, it forces them to carry around yet one more piece of equipment when they travel. In addition, once the traveler gets to a place with a power source, they often must make the difficult choice whether to use the battery charger to charge the spare battery, or to use it to run the computer to get the work done. This solution is undesirable to very active business travelers, also known as road warriors, who often spend precious little time in places with power sources that the battery charger can plug into. These road warriors often find themselves in the untenable position of lugging around a portable computer, a battery charger, and two batteries—both of which are now dead—all across the country or the world. All of this equipment sits in the road warrior's briefcase, utterly useless for large portions of their trip.

SUMMARY OF THE INVENTION

A battery charger is connected to a power source via an input cable. The battery charger has charge switching circuitry for delivering a charge to a battery under the control of a controller. The controller has state detection logic for detecting the current state of the battery, and charging logic for charging the battery by selectively enabling and disabling the charge switching circuitry based on the condition of the battery. An output cable is connected to the battery charger. The output cable delivers power from the power source to a second battery charger for charging a second battery for the electronic device. The output cable can be placed in a stowage position or a non-stowage position. The second battery charger may be external or internal to the electronic device. If the second battery charger is internal to the electronic device, two batteries can be charged at the same time the electronic device is being operated. The battery charger has the additional capability of detecting and correctly charging different battery types, and responding to error conditions detected during the charging operation.

DETAILED DESCRIPTION OF THE PREFERRED EMBODIMENT

Figure 1:
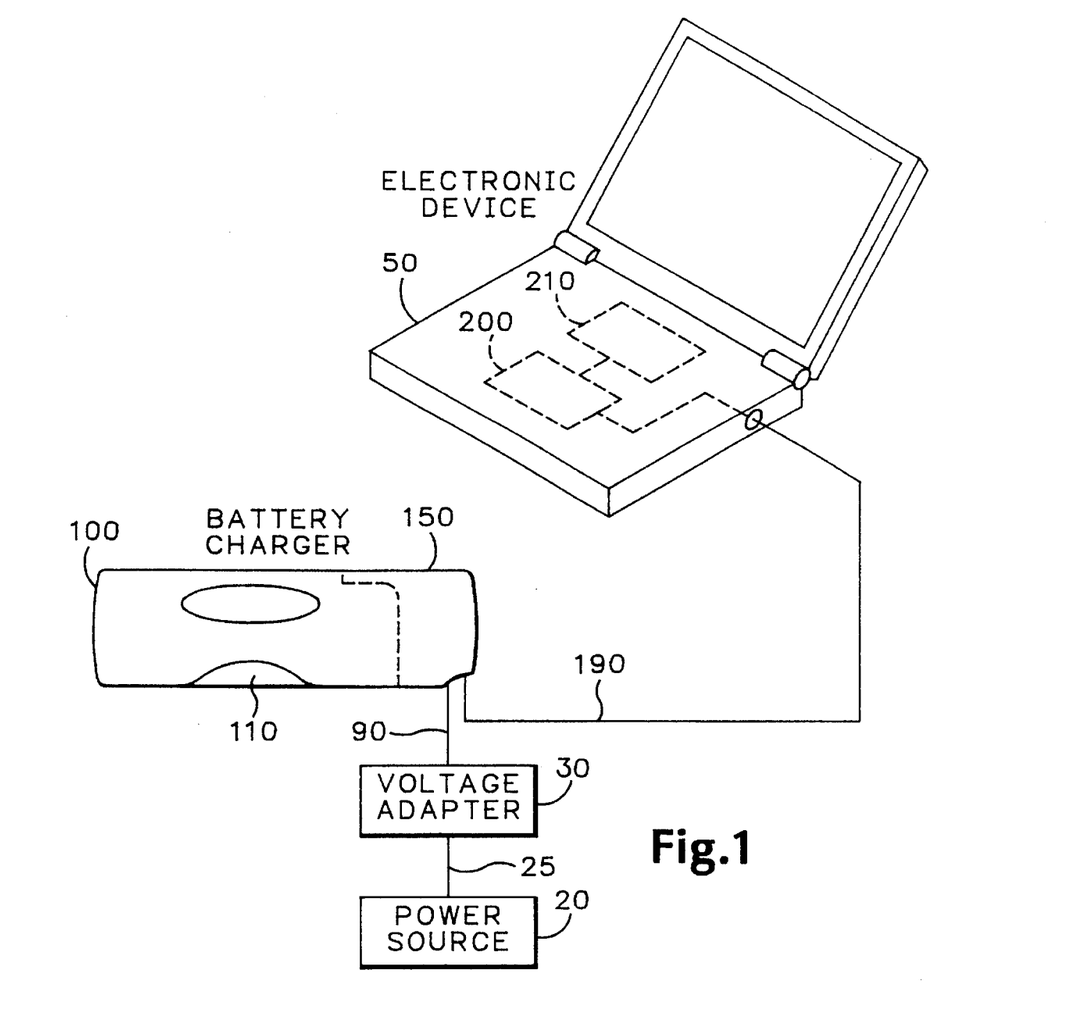
FIG. 1 shows the battery charger of the preferred embodiment of the invention connected to an electronic device.

FIG. 1 shows the battery charger of the preferred embodiment of the invention connected to an electronic device. Battery charger 100 is connected via input cable 90 to voltage adapter 30, which is connected to power source 20 via power line 25. In the preferred embodiment, power source 20 is a conventional AC power source, such as 110–120 volt, 50–60 Hz power commonly found in office buildings, homes, etc. throughout most of the world.

Voltage adapter 30 converts the voltage from power source 20 to a voltage level and type appropriate for use by battery charger 100. In the preferred embodiment, battery charger 100 operates on 12 volts DC plus or minus 20%, with a minimum power of 20 watts. Several conventional and inexpensive voltage adapters, such as a voltage adapter sold by Tandy Corporation in their Radio Shack stores, could therefore be used as voltage adapter 30.

Alternatively, power source 20 could be a 12 volt DC power source commonly available in automobiles via a cigarette lighter or other power interface. In this embodiment, an exemplary voltage adapter used as voltage adapter 30 could be a voltage adapter sold by Tandy Corporation in their Radio Shack stores.

Battery charger 100 contains battery charger circuitry 150, which will be discussed in more detail later. Battery 110 slides into a portion of battery charger 100, interfacing with battery charger circuitry 150 in a manner that will be explained in more detail later. Input cable 90 delivers power from power source 20 to battery charger circuitry 150. Output cable 190 is also connected to battery charger circuitry 150. Output cable 190 can be connected to an electronic device 50. In the preferred embodiment, electronic device 50 is a portable computer, such as an Omni-Book subnotebook portable computer manufactured and sold by the assignee of the present invention. Those skilled in the art will appreciate that electronic device 50 could be another portable computer, or another electronic device, such as a tape player, CD player, radio, tape recorder, television, etc, and still fall within the spirit and scope of the invention. Device 50 has second battery charger 200, connected to second battery 210. When battery charger 100 is connected to device 50 as shown in FIG. 1, electronic device 50 can be operated off of power source 20 and voltage adapter 30, while batteries 110 and 210 are both being charged.

In the preferred embodiment, the circuitry in second battery charger 200 is substantially identical to battery charger circuitry 150. Therefore, when desired by the user, input cable 90 could be plugged directly into electronic device 50, thereby bypassing battery charger 100.

Figure 2:
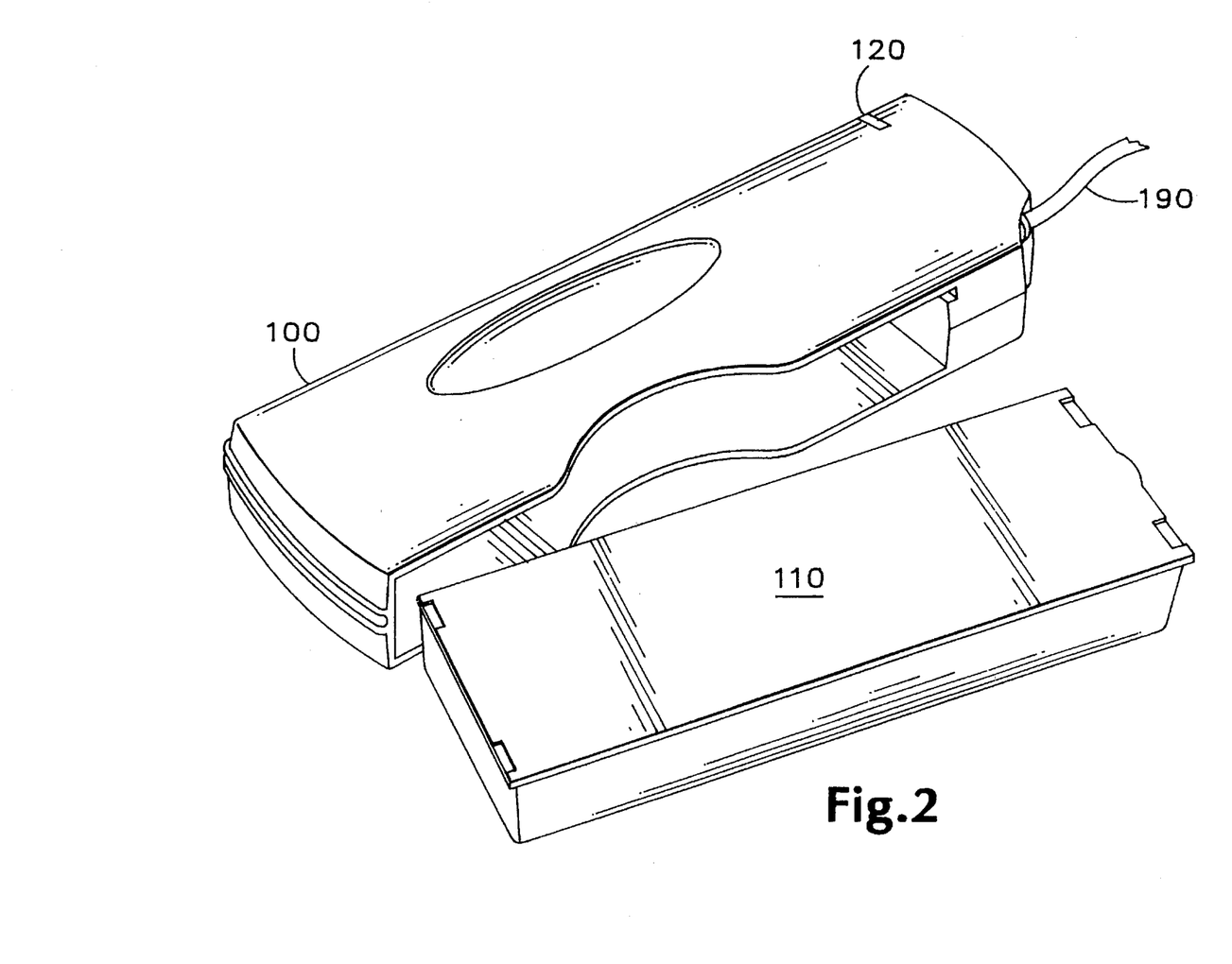
FIGS. 2–4 show the battery charger of the preferred embodiment of the invention in more detail.
Figure 3:
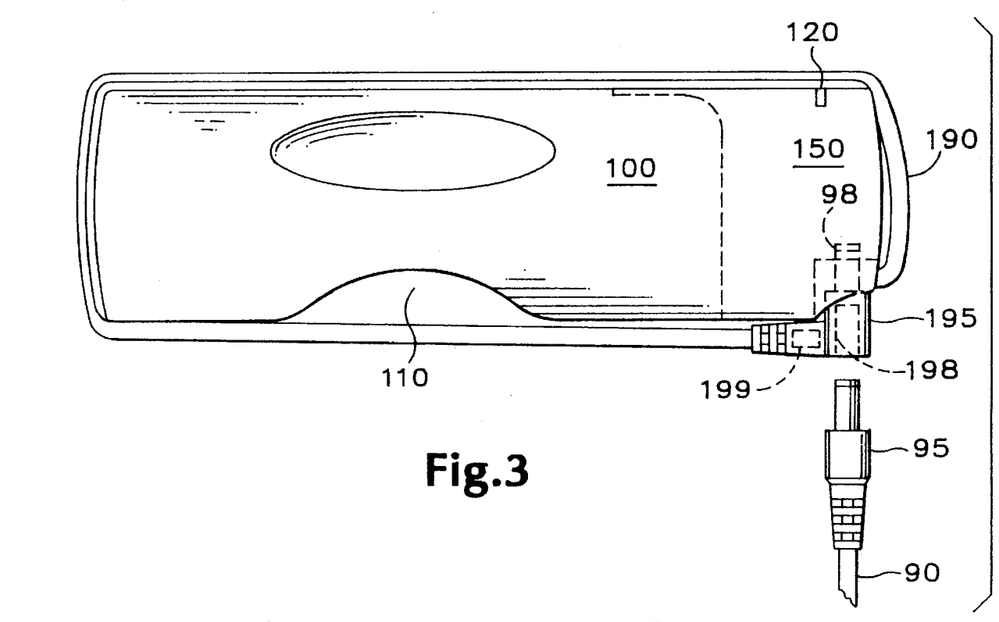
Figure 4:
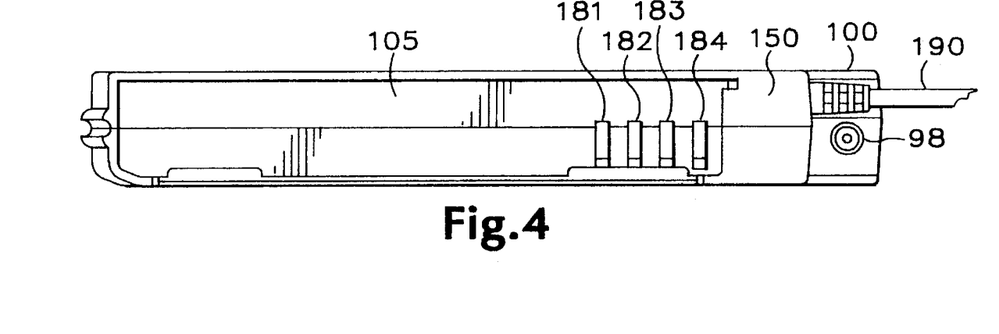

FIGS. 2–4 show the battery charger of the preferred embodiment of the invention in more detail. FIG. 2 shows a perspective view of battery charger 100 and battery 110. Indicator 120 and output cable 190 are also shown.

FIG. 3 shows a top view of battery charger 100. In this view, output cable 190, output cable plug 195, input cable 90, and input cable plug 95 are shown.

Output cable 190 is shown wrapped around the perimeter of battery charger 100, with output cable plug 195 terminating in battery charger jack 98. This position of output cable 190 is referred to herein as the "stowage position".

Output cable plug 195 contains output cable jack 198. Output cable jack 198 is capable of receiving input cable plug 95 from input cable 90. When output cable 190 is in its stowage position and input cable plug 95 is inserted into output cable jack 198, output cable 190 is electrically inactivated by interlock switch 199, and battery charger circuitry 150 charges battery 110 from power received via input cable 90.

FIG. 4 shows a front view of battery charger 100. In this view, output cable 190 and battery charger jack 98 are shown. Battery 110 has been removed from battery charger 100 in this view, leaving battery cavity 105. Battery contacts 181–184 connect battery 110 to battery charger circuitry 150.

Figure 5:
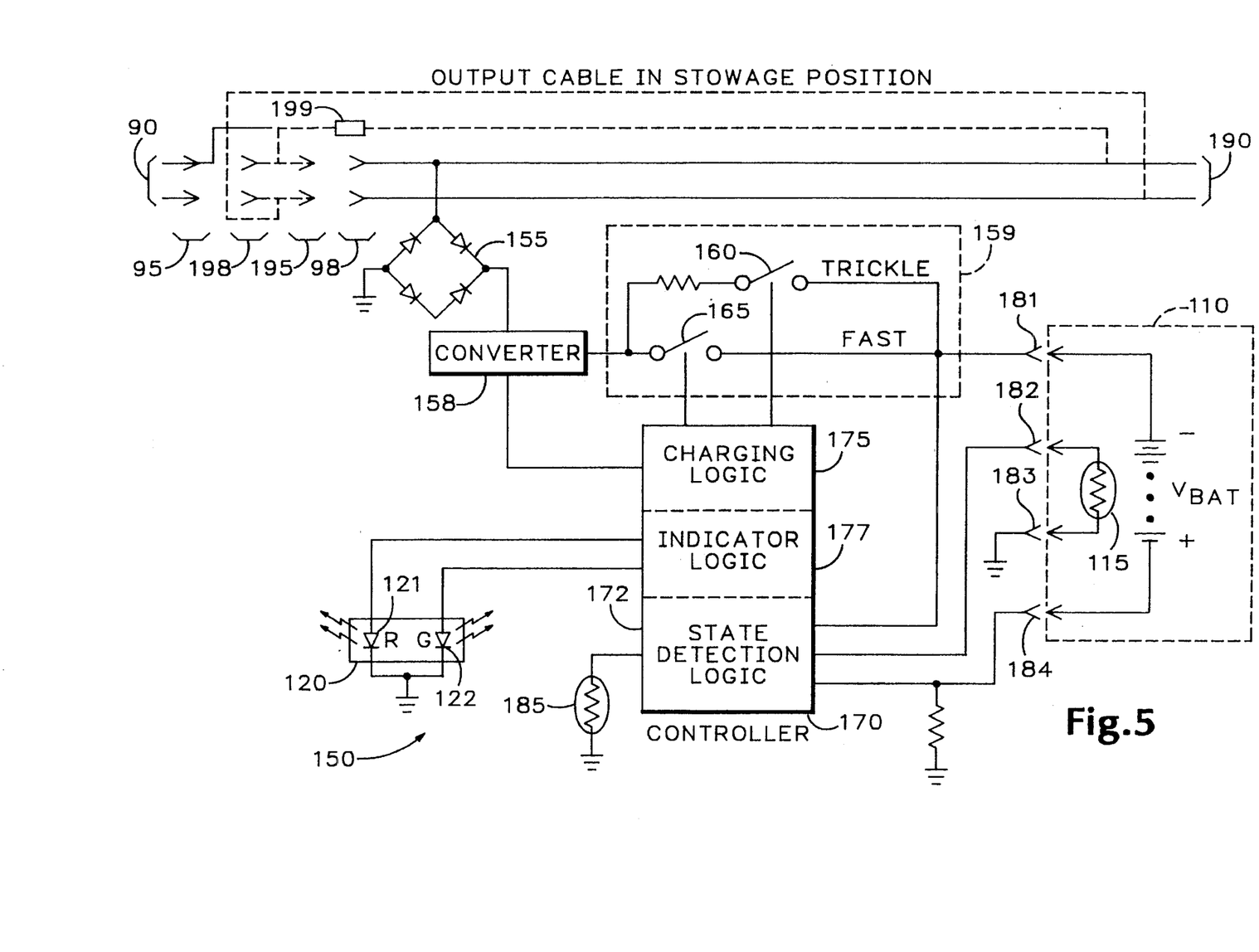
FIG. 5 shows a diagram of the battery charger circuitry of the preferred embodiment of the invention.
Figure 13:
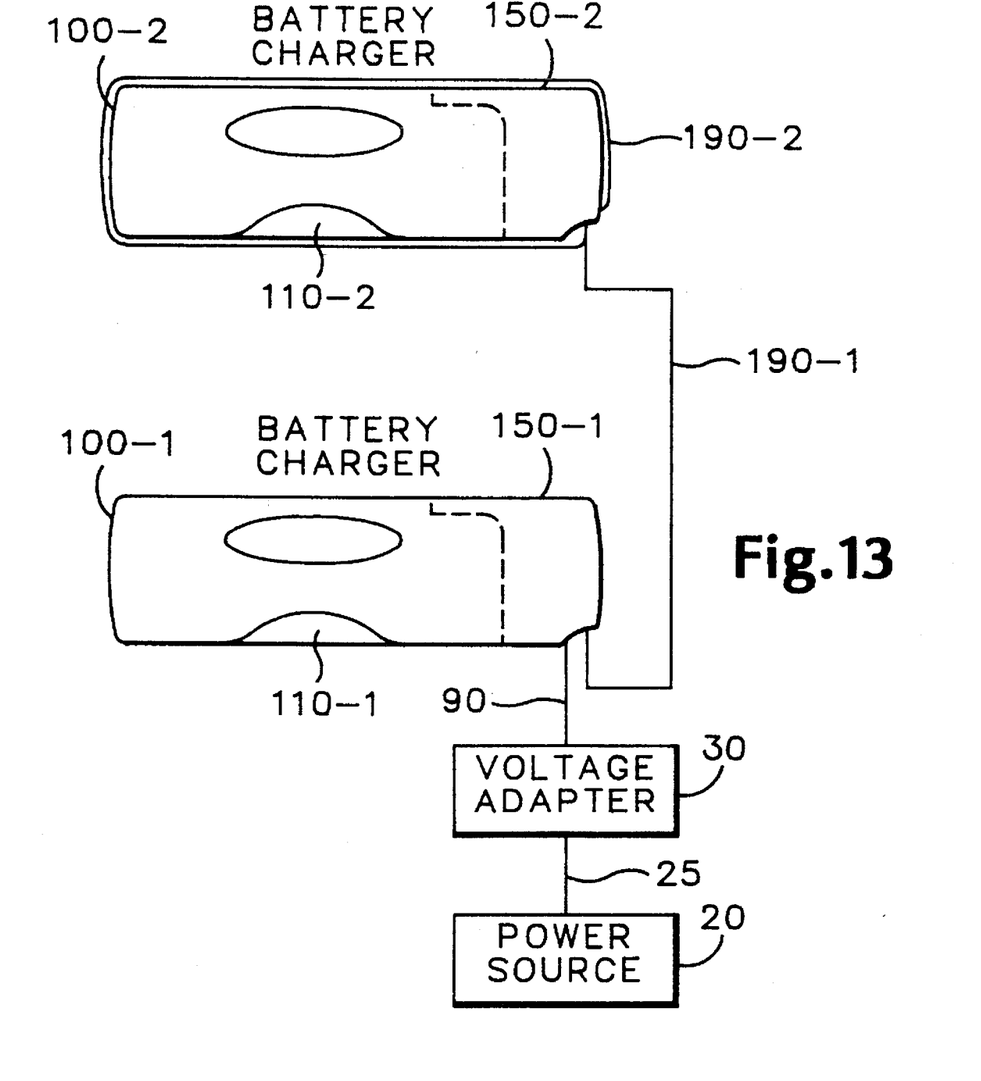
FIGS. 13–14 show how multiple battery chargers can be chained together in alternate embodiments of the invention.
Figure 14:
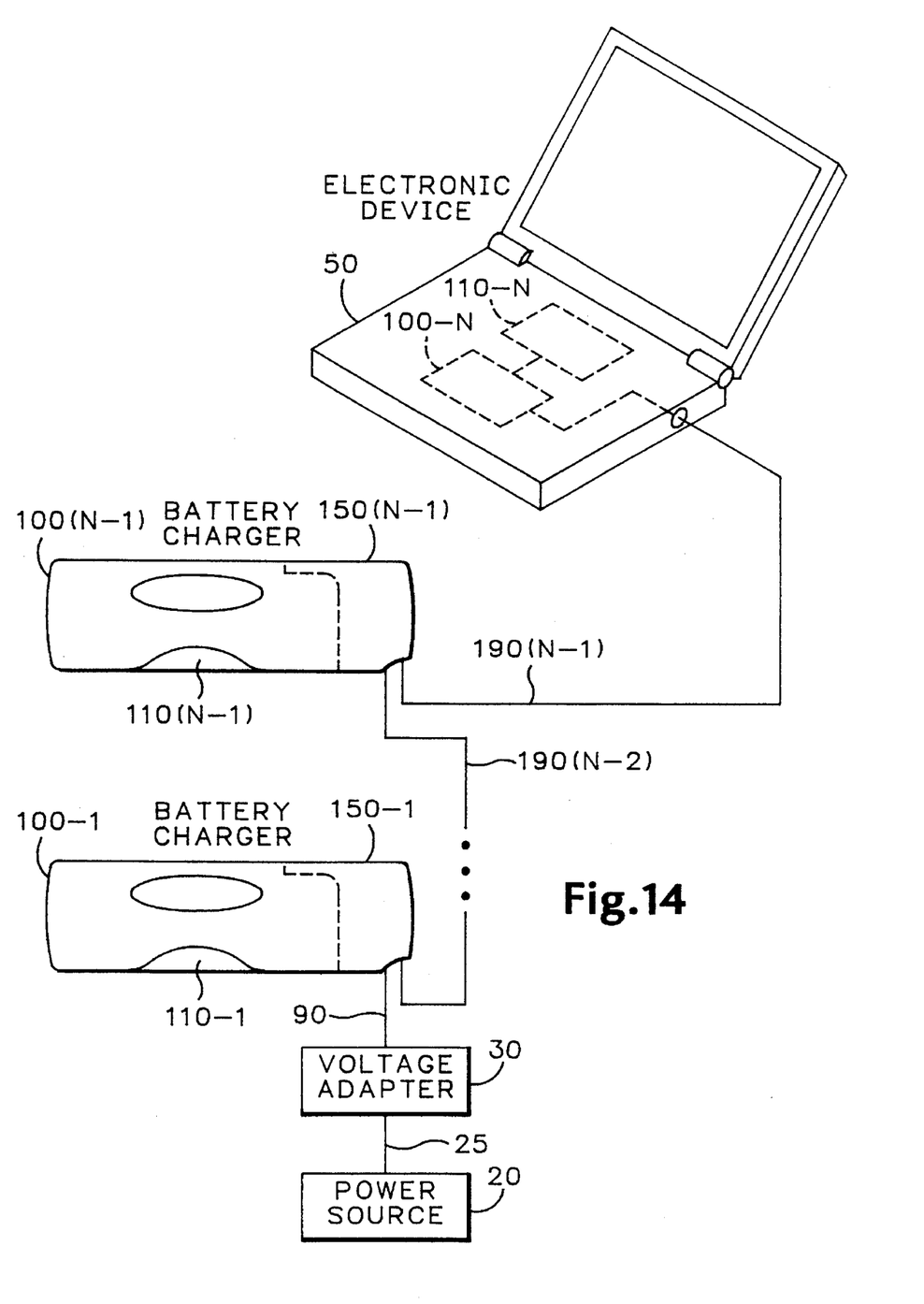

FIG. 5 shows a diagram of the battery charger circuitry of the preferred embodiment of the invention. Input cable 90 is connected to battery charger circuitry 150 via input cable plug 95 and battery charger jack 98. If output cable 190 is in the stowage position, as discussed above, input cable plug 95 plugs into output cable jack 198, and output cable plug 195 plugs into battery charger jack 98. If output cable 190 is in the stowage position, it is electrically inactived by interlock switch 199, and all the power from input cable 90 is available for use by battery charger 100. If output cable 190 is in its non-stowage position (i.e. connected to a second battery charger, either external or internal to an electronic device, as is shown in FIGS. 1, 13 and 14), some of the power from input cable 90 is available for use by battery charger 100, while some of the power from input cable 90 is available for use by other battery charger(s) and/or an electronic device.

Battery charger circuitry 150 of battery charger 100 will now be discussed. Power from input cable 90 is provided to rectifier 155. Rectifier 155 allows for the voltage on input cable 90 to be either positive or negative. In other words, input plug 95 can have either a positive or a negative inside conductor, allowing for a wider variety of voltage adapters to be used for voltage adapter 30 (FIG. 1).

Converter 158 is a current limited voltage source that has the ability to boost the voltage from input cable 90 up to the voltage of the battery, if necessary, during the charging operation. This allows for a very inexpensive voltage adapter with a wide tolerance range of voltage output (a portion of which may be less than the fully charged voltage level of battery 110) to be used for voltage adapter 30 (FIG. 1). The operation of converter 158 varies by battery type, as will be discussed in more detail later.

Charge switching circuitry 159 is operatively coupled to input cable 90 via rectifier 155 and converter 158. In the preferred embodiment, charge switching circuitry 159 is made up of trickle charge switch 160 and fast charge switch 165. When enabled, trickle charge switch 160 delivers a trickle (i.e. slow) charge to battery 110. When enabled, fast charge switch 165 delivers a fast charge to battery 110. Both trickle charge switch 160 and fast charge switch 165 are operatively coupled to controller 170.

Controller 170 contains state detection logic 172, charging logic 175, and indicator logic 177. State detection logic 172 detects the current state of battery 110 (i.e. needs fast charge, needs slow charge, fully charged, not present, not chargeable, etc.). This information is obtained by analyzing the information from battery 110 via battery contacts 181–184, as well as from thermistor 185, as will s be described in more detail later. Charging logic 175 is responsive to state detection logic 172, and charges battery 110 by selectively enabling and disabling trickle charge switch 160 and fast charge switch 165. Indicator logic 177 is responsive to state detection logic 172 and charging logic 175 and indicates to a user via indicator 120 whether battery 110 is charging, is charged, or whether an error was detected during the charging operation. In the preferred embodiment, indicator 120 is a three state indicator made up of red LED 121 and green LED 122. When red LED 121 is lit, an "error" condition is indicated. When green LED 122 is lit, a "charged" condition is indicated. When both red LED 121 and green LED 122 are lit, the resulting combination of light is amber, indicating a "charging" condition.

Figure 6:
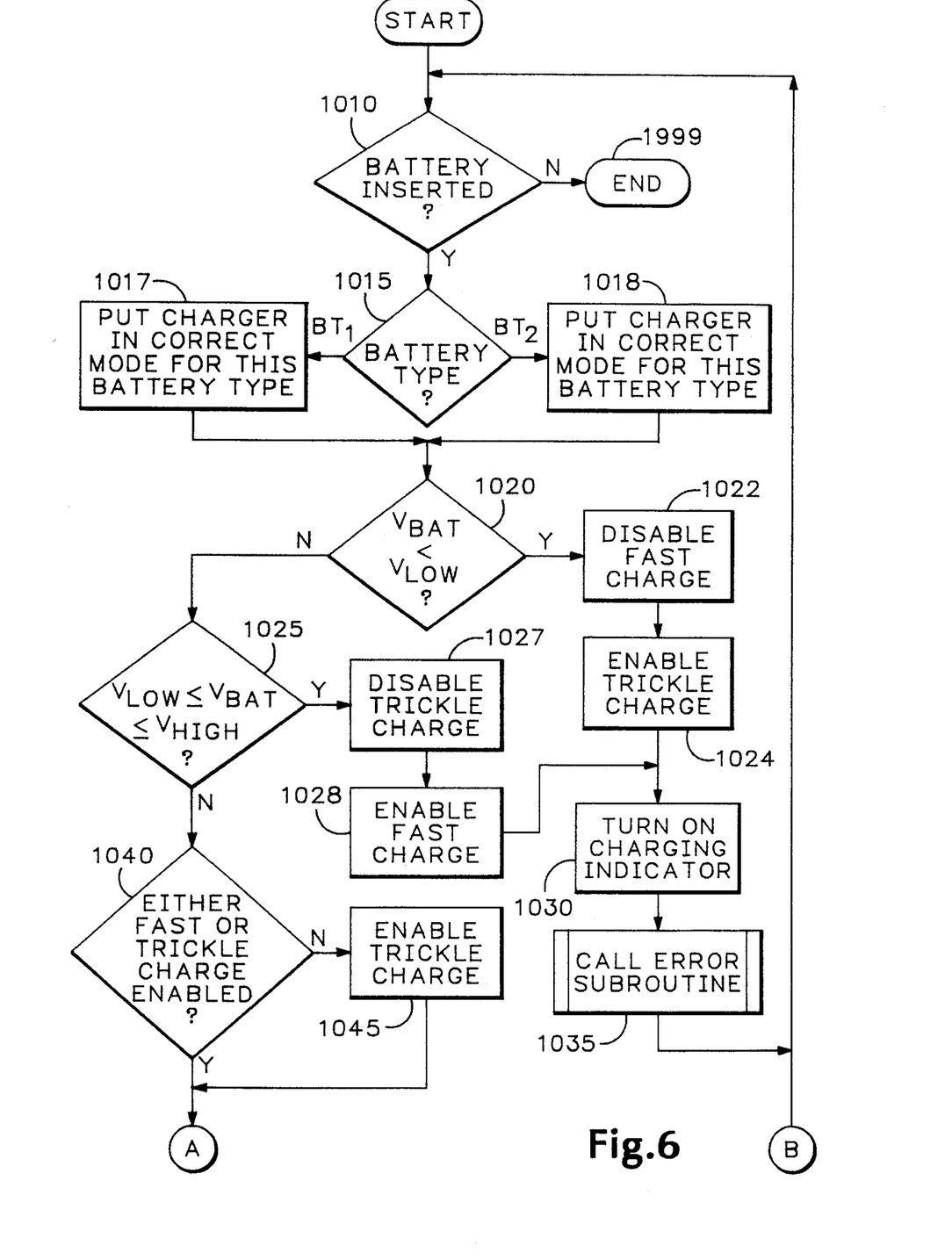
FIGS. 6–8 show flowcharts of the operation of the controller of the battery charger of the preferred embodiment of the invention.
Figure 7:
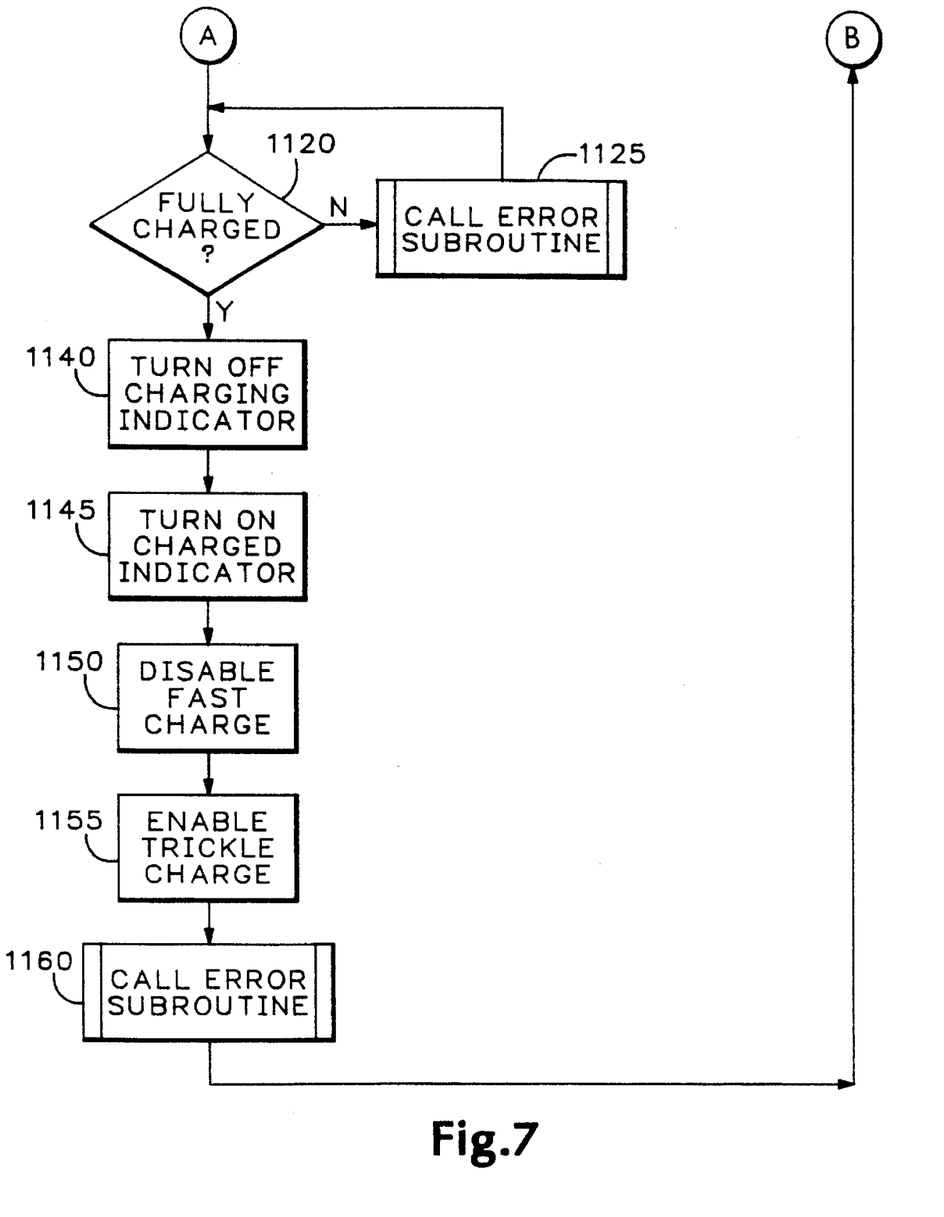
Figure 8:
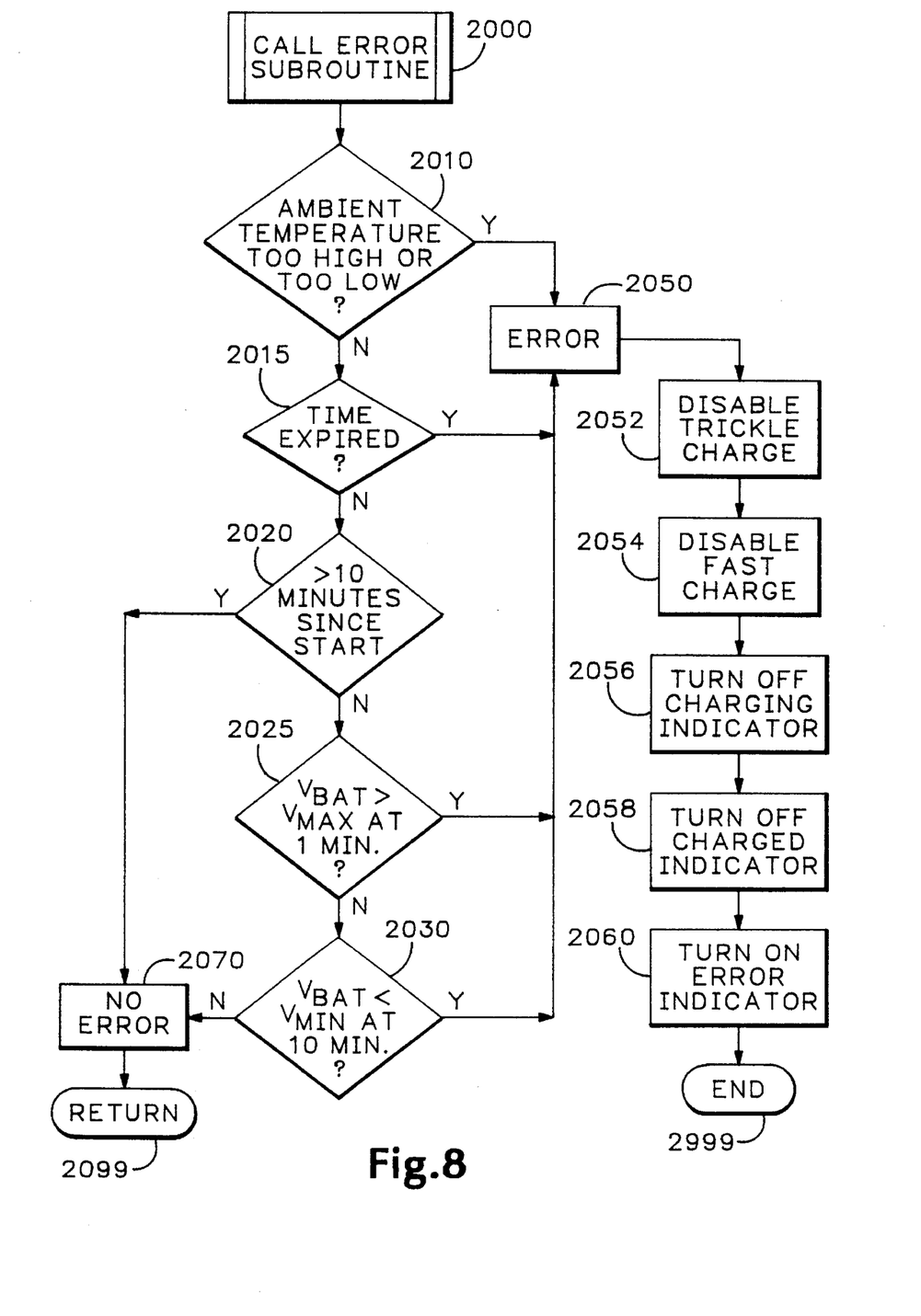

FIGS. 6–8 show flowcharts of the operation of controller 170 of the battery charger of the preferred embodiment of the invention. The operation of the flowcharts shown in FIGS. 6–8 will be discussed in conjunction with the graphs of FIGS. 9–12, as well as the circuit diagram of FIG. 5. In the preferred embodiment, controller 170 is a Motorola controller, suitably programmed to execute the flowcharts of FIGS. 6–8, and connected as shown in FIG. 5.

Referring now to FIG. 6, Block 1010 determines whether battery 110 is inserted into battery charger 100. This is determined by measuring the resistance across battery contacts 182 and 183 (FIG. 5). If the resistance exceeds a large amount, for example, 100 K$\Omega$, no battery is inserted. If block 1010 determines that a battery is not inserted, the program ends in block 1999. If block 1010 determines that a battery is inserted, block 1015 checks to see what type of battery is inserted into battery charger 100. In the preferred embodiment, battery charger 100 supports two different types of batteries: Nickel Metal Hydride and Lithium Ion. Battery 110 shown in FIG. 5 is of the Nickel Metal Hydride type, and contains thermistor 115. If battery 110 was of the Lithium Ion type, thermistor 115 would be replaced with a wire, thereby directly connecting battery contacts 182 and 183.

Figure 9:
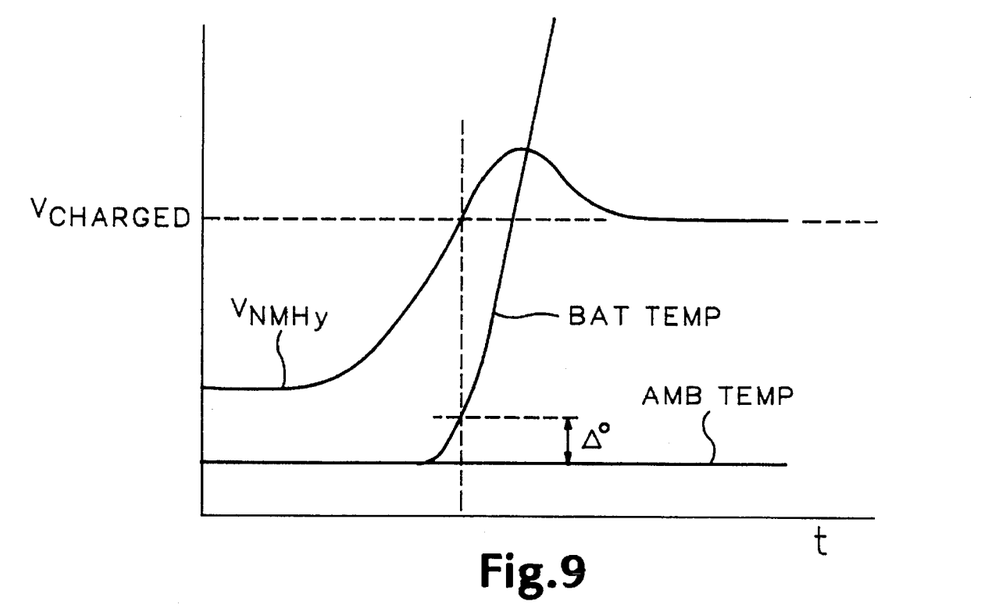
FIGS. 9–10 show the charging characteristics of two battery types supported by the battery charger of the preferred embodiment of the invention.
Figure 11:
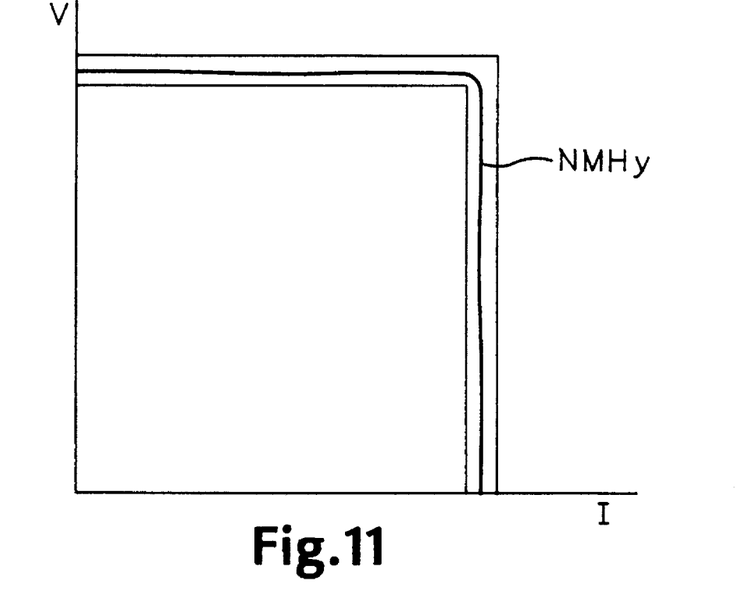
FIGS. 11–12 show the characteristic curves of the converter by battery type in the battery charger of the preferred embodiment of the invention.

Block 1015 determines what battery type is inserted into battery charger 110 by again measuring the resistance across battery contacts 182 and 183. If the resistance is very low (e.g., between 0Ω and 1KΩ) the battery is of the Lithium Ion type, since battery contacts 182 and 183 are directly connected. If the s resistance is neither very low nor very high (e.g., between 1KΩ and 100KΩ), the battery is a Nickel Metal Hydride type, since thermistor 115 varies in this resistance range from a high resistance when it is very cold to a low resistance when it is very warm. If a Nickel Metal Hydride battery type is detected, flow of control moves to block 1017, which puts charger 100 in the proper mode for this battery type. Specifically, converter 158 follows the converter characteristic curve for Nickel Metal Hydride shown in FIG. 11. As FIG. 11 shows, converter 158 takes on the characteristic of a current limited voltage source. This is important for Nickel Metal Hydride batteries, since Nickel Metal Hydride batteries operate in a very narrow voltage range when fully charged, as is shown in FIG. 9. In addition, the logic shown in the flowcharts takes the battery type into account, as will be discussed in more detail later.

Figure 10:
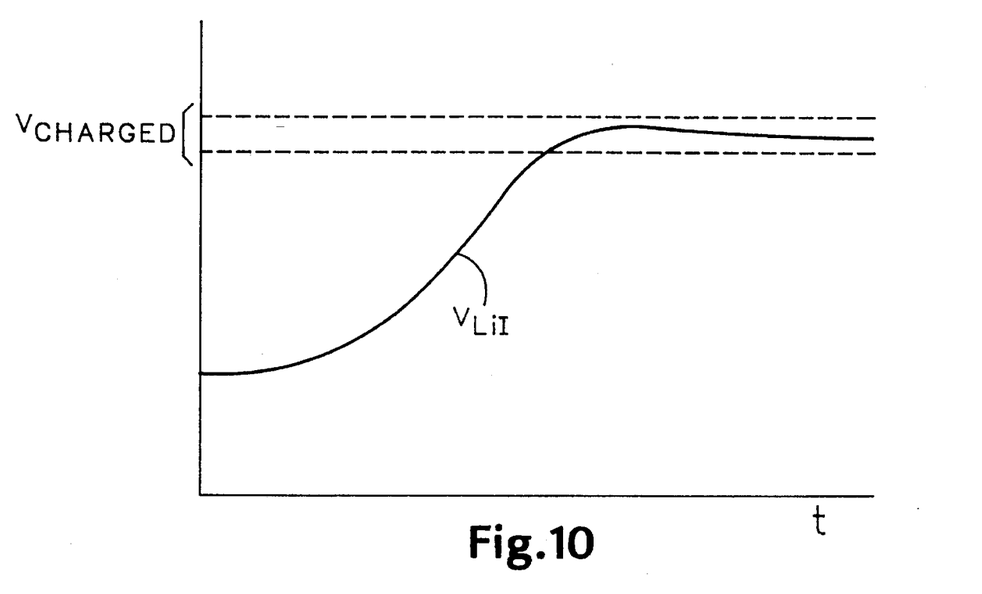
Figure 12:
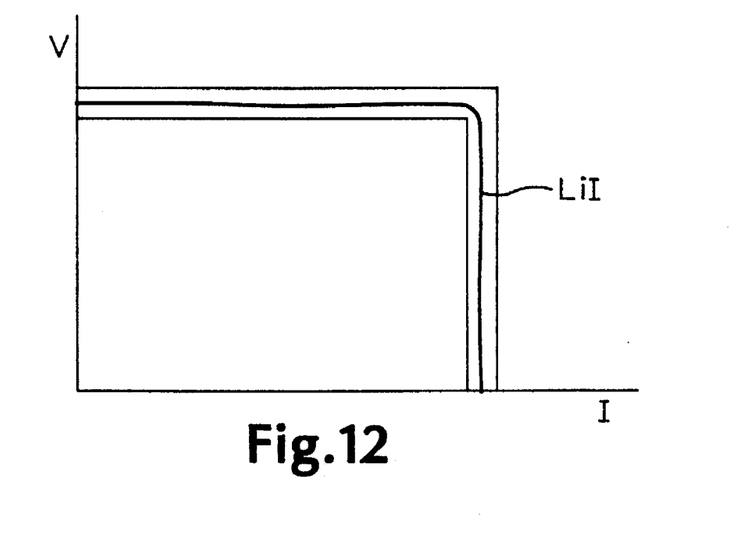

If a Lithium Ion battery type is detected, flow of control moves to block 1018, which puts charger 100 in the proper mode for this battery type. Specifically, converter 158 follows the converter characteristic curve for Lithium Ion shown in FIG. 12. As FIG. 12 shows, converter 158 takes on the same general characteristics of the current limited voltage source shown in FIG. 11, but at a lower voltage level appropriate for this different battery type. This is important for Lithium Ion batteries, since Lithium Ion batteries operate in a very narrow voltage range when fully charged, as is shown in FIG. 10. In addition, the logic shown in the flowcharts takes the battery type into account, as will be discussed in more detail later. Those skilled in the art will appreciate that blocks 1015–1018 could be modified to detect and support additional or different battery types other than Nickel Metal Hydride and Lithium Ion and still fall within the spirit and scope of the invention.

Regardless of what battery type is detected in block 1015, block 1020 checks to see if the voltage of the battery is less than a predetermined low voltage. This is done by checking the voltage across battery contacts 181 and 184. If the battery voltage is less than this predetermined low voltage, battery 110 is in a state of very low charge, making it potentially damaging to fast charge the battery. Therefore, block 1022 disables fast charge switch 165 by assuring that it is open. Block 1024 enables trickle charge switch 160 by assuring it is closed. Block 1030 turns on an indication that battery 110 is charging by activating both LED 120 and LED 121 of indicator 120.

If block 1020 determines that the battery voltage exceeds this predetermined low voltage, block 1025 checks to see if the battery voltage is equal to or between this predetermined low voltage and a predetermined high voltage. If so, battery 110 is in a state where it can be fast charged. Block 1027 disables trickle charge switch 160 by assuring that it is open. Block 1028 enables fast charge switch 165 by assuring it is closed. Block 1030 turns on an indication that battery 110 is charging by activating both LED 120 and LED 121 of indicator 120.

If battery 110 is greater than the predetermined high voltage, battery 100 is in a state where it is fully charged, and a trickle charge is appropriate to maintain this fully charged state. Block 1040 asks whether either fast charge switch 165 or trickle charge switch 160 has previously been enabled. If not, as would be the case when a fully charged or nearly fully charged battery is inserted into battery charger 100, block 1045 enables trickle charge switch 160 by assuring it is closed.

Block 1120 (FIG. 7) checks to see if battery 110 is fully charged according to charge conditions appropriate for the battery type determined in block 1015. If block 1015 determined that the battery type is Nickel Metal Hydride, a fully charged condition is determined by relying on a property of Nickel Metal Hydride batteries, shown in more detail in the graph of FIG. 9. As FIG. 9 shows, the temperature of a Nickel Metal Hydride battery rises rapidly when the battery reaches a fully charged condition. Since it is important to stop charging Nickel Metal Hydride batteries before they reach an overcharge condition and get too hot (which reduces battery life and raises potential safety issues), the temperature of the battery is a reliable early indication of a fully charged condition. Therefore, block 1120 measures the difference in the temperature of the battery (via thermistor 115) and the ambient temperature of the battery charger itself (via thermistor 185). When this difference exceeds a predetermined threshold ($\Delta°$), the battery is considered to be fully charged. Block 1140 turns off the "charging" indicator by turning off LEDs 121 and 122 of indicator 120. Block 1145 turns on the "charged" indicator by turning on green LED 122 of indicator 120. Block 1150 disables fast charge switch 165 by assuring it is open. Block 1155 enables trickle charge switch 160 by assuring it is closed. This trickle charge maintains the fully charged state of battery 110.

If the battery type is Lithium Ion, block 1120 checks to see if battery 110 is fully charged according to charge conditions appropriate for Lithium Ion. This is done by checking to see if the battery voltage is within a fully charged voltage range, as is shown graphically in FIG. 10. Unlike Nickel Metal Hydride battery types, Lithium Ion battery types cannot use temperature to determine an overcharge condition; therefore a simple voltage measurement across battery contacts 181 and 184 is appropriate to determine if the battery is fully charged. If the battery is fully charged, block 1140 turns off the "charging" indicator by turning off LEDs 121 and 122 of indicator 120. Block 1145 turns on the "charged" indicator by turning on green LED 122 of indicator 120. Block 1150 disables fast charge switch 165 by assuring it is open. Block 1155 enables trickle charge switch 160 by assuring it is closed. This trickle charge maintains the fully charged state of battery 110.

There are several points in the flowcharts of FIGS. 6 and 7 where error subroutine 2000 is called: in block 1035 after the charging indicator is turned on; in block 1125 after an indication from block 1120 that the battery was not fully charged; and in block 1160 after the battery is considered fully charged. Error subroutine 2000 checks to see if any error conditions occur during the charging operation, as is shown in FIG. 8.

Referring now to error subroutine 2000 of FIG. 8, block 2010 checks to see if the ambient temperature is either too high or too low to safely and reliably operate battery charger 100. This is determined by measuring the resistance of thermistor 185. If the ambient temperature is too high or too low, an error condition has occurred. Block 2052 disables trickle charge switch 160 by assuring it is open. Block 2054 disables fast charge switch 165 by assuring it is open. Block 2056 turns off the "charging" indicator by turning off green LED 122 of indicator 120. Block 2058 turns off the "charged" indicator by turning off both red LED 121 and green LED 122. Block 2060 turns on the "error" indicator by turning on red LED 121, and the subroutine terminates the program in block 2999.

If block 2010 determines that the ambient temperature is neither too high nor too low, block 2015 checks to see if a time out period has expired. If so, the battery has failed to become fully charged even though ample time has elapsed for it to become fully charged under normal conditions. Blocks 2052–2060 are then executed, as previously discussed. In the preferred embodiment, this time out period is approximately 3.5 hours long.

If the time out period has not yet expired, block 2020 checks to see if more than ten minutes have elapsed since the battery was first detected as being inserted in block 1010. If not, block 2025 checks to see if the battery voltage exceeds a predetermined maximum voltage at the one minute mark since insertion. If so, an error condition has occurred; the battery has an open cell or another problem that has caused it to exceed a normal, fully charged voltage. Blocks 2052–2060 are then executed, as previously discussed.

If block 2025 is answered negatively, block 2030 checks to see if the battery voltage is less than a predetermined low voltage at the ten minute mark since insertion, in a manner similar to block 1020 of FIG. 6. If the battery voltage is less than the predetermined low voltage at this ten minute mark, an error condition has occurred; the battery has a short circuit or another problem that is preventing it from taking a charge. Blocks 2052–2060 are then executed, as previously discussed.

If block 2030 is answered negatively, or block 2020 is answered positively, no error conditions were discovered by error subroutine 2000, and the subroutine returns to the block from which it was called in block 2099. If the subroutine was called by blocks 1035 or 1160, flow of control loops back to the beginning of the program to execute block 1010. If the subroutine was called by block 1125, the battery was not yet fully charged, and flow of control loops back to block 1120 to check once again to see if the battery is now fully charged.

FIGS. 13–14 show how multiple battery chargers 100 can be chained together in alternate embodiments of the invention. FIG. 13 shows two battery chargers 100-1 and 100-2 chained together. Output cable 190-1 of battery charger 100-1 is in its non-stowed position. Output cable 190-2 of battery charger 100-2 is in its stowed position (i.e., wrapped around battery charger 100-2, where output cable plug 195-2 (not shown) is plugged into jack 98-2 (not shown)), in a manner similar to that shown in FIG. 3. Output cable plug 195-1 (not shown) of battery charger 100-1 is plugged into output cable jack 198-2 (not shown), in a manner similar to that shown in FIG. 3. In this configuration, both battery 110-1 and battery 110-2 are charged by power source 20 and adapter 30.

FIG. 14 shows N battery chargers 100-1 to 100-N chained together, where battery charger 100-N is internal to device 50 but contains substantially identical circuitry and function to battery chargers 100-1 to 100-(N-1). All output cables 190-1 to 190-N-1 are in their non-stowed position. In this configuration, batteries 110-1 throughout 110-N are all charged by power source 20 and adapter 30. In addition, device 50 operates on power from power source 20 and adapter 30. In this configuration, the number of battery chargers "N" is limited by the power rating of voltage adapter 30 and, ultimately, the current handling capability of the cables and connectors. For example, if each battery charger 100 requires 10 watts to charge each battery 110, and if device 50 requires 10 watts to operate, and if voltage adapter 30 had a power rating of 70 watts, N would equal six. This ability to chain a number of battery chargers 100 together and still operate device 50 allows users the flexibility of charging multiple batteries while still running an electronic device—all from a single voltage adapter.

What is claimed is:

1. A portable battery charger, comprising:

a battery charger case forming a battery cavity capable of receiving a battery;

battery charger circuitry adjacent to said battery cavity in said battery charger case;

a first jack adjacent to said battery cavity in said battery charger case for receiving an input cable plug connected to an input cable, said input cable connected to a power source;

an output cable having a first end and a second end, said first end integrally attached to said portable battery charger, said second end connected to an output cable plug;

said output cable being of sufficient length to wrap around the perimeter of said battery charger case and allowing said output cable plug to be inserted into said first jack instead of said input cable plug, thereby placing said output cable in a stowage position; and said battery charger circuitry charging said battery from said power source when said battery is inserted in said battery cavity and said input cable plug is inserted into said first jack.

2. The portable battery charger of claim 1, wherein said output cable plug further comprises:

a second jack capable of receiving said input cable plug, said second jack and said output cable plug being electrically connected; and said battery charger circuitry charging said battery from said power source when said battery is inserted in said battery cavity, said output cable is in said stowage position and said input cable plug is inserted into said second jack.

3. The portable battery charger of claim 2, wherein said output cable plug further comprises:

an interlock switch to electrically inactivate said output cable when said input cable plug is inserted into said second jack.

4. The portable battery charger of claim 1, wherein said output cable plug is inserted into a third jack in an electronic device; and said power source operating said electronic device via said output cable when said input cable plug is inserted into said first jack of said portable battery charger.

5. The portable battery charger of claim 1, wherein said battery cavity is of substantially the same size as the battery.

6. The battery charger of claim 1, further comprising:

state detection logic for detecting that said first battery is of a first battery type.

7. The battery charger of claim 6, wherein said state detection logic operates in a first charging mode responsive to detecting that said first battery is of said first battery type.

8. The battery charger of claim 7, wherein said state detection logic detects that said first battery is of a second battery type.

9. The battery charger of claim 8, wherein said state detection logic operates in a second charging mode responsive to detecting that said first battery is of said second battery type.

10. A method of charging a first battery and a second battery for an electrical device, said first battery connected to a first portable battery charger, said second battery connected to a second portable battery charger, said first portable battery charger having a first battery cavity for said first battery, first battery charger circuitry, a first jack and a first output cable, said first output cable having a first end integrally attached to said first portable battery charger and a second end connected to a first output cable plug, said second portable battery charger having a second battery cavity for said second battery, second battery charger circuitry, a second jack and a second output cable having a first end integrally attached to said second portable battery charger and a second end connected to a second output cable plug, said method comprising the steps of:

inserting an input cable plug into said first jack, said input cable plug connected to an input cable, said input cable connected to a power source;

inserting said first output cable plug into said second jack of said second portable battery charger, said second portable battery charger receiving power from said power source via said first output cable;

said first portable battery charger detecting the presence of said first battery in said first battery cavity;

said first portable battery charger charging said first battery responsive to said first portable battery charger detecting step;

said second portable battery charger detecting the presence of said second battery in said second battery cavity;

said second portable battery charger charging said second battery responsive to said second portable battery charger detecting step;

inserting said second output cable plug into a third jack on said electronic device; and     said power source operating said electronic device via said first output cable and said second output cable.

11. The method of claim 10, wherein said electronic device comprises a third battery charger and a third battery connected to said third jack, said method further comprising the steps of:

said third battery charger detecting the presence of said third battery connected to said third battery charger; and     said third battery charging circuit charging said third battery responsive to said third battery charger detecting step.

12. A method of charging a battery in a portable battery charger, said portable battery charger having a battery cavity for said battery, battery charger circuitry, a first jack and an output cable, said output cable having a first end and a second end, said first end integrally attached to said portable battery charger, said second end connected to an output cable plug, said method comprising the steps of:

wrapping said output cable around the perimeter of said battery charger case;

inserting said output cable plug into said first jack;

transporting said portable battery charger to a new location;

removing said output cable plug from said first jack;

inserting an input cable plug connected to an input cable connected to a power source into said first jack; and     charging said battery via said input cable.

13. The method of claim 12, further comprising the step of:

unwrapping said output cable from the perimeter of said battery charger case.

14. A method of charging a battery in a portable battery charger, said portable battery charger having a battery cavity for said battery, battery charger circuitry, a first jack and an output cable, said output cable having a first end and a second end, said first end integrally attached to said portable battery charger, said second end connected to an output cable plug, said method comprising the steps of:

wrapping said output cable around the perimeter of said battery charger case;

inserting said output cable plug into said first jack;

transporting said portable battery charger to a new location;

inserting an input cable plug into a second jack contained in said output cable plug, said input cable plug connected to an input cable connected to a power source, said first jack and said second jack being electrically connected via said output cable plug; and     charging said battery via said input cable.

\* \* \* \* \*